(12) United States Patent
Baird et al.

(10) Patent No.: US 10,638,270 B2
(45) Date of Patent: Apr. 28, 2020

(54) LOCATION-BASED WIRELESS TRACKING

(71) Applicant: T-Mobile USA, Inc., Bellevue, WA (US)

(72) Inventors: Joseph Baird, Bellevue, WA (US); Nicholas LaVassar, Issaquah, WA (US); Christopher Painter, North Bend, WA (US); Parag Garg, Woodinville, WA (US); Gavin Feuer, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/249,838

(22) Filed: Jan. 16, 2019

(65) Prior Publication Data

US 2020/0015040 A1 Jan. 9, 2020

Related U.S. Application Data

(60) Provisional application No. 62/693,893, filed on Jul. 3, 2018.

(51) Int. Cl.
| | |
|---|---|
| *H04W 4/029* | (2018.01) |
| *H04W 4/02* | (2018.01) |
| *H04W 4/80* | (2018.01) |
| *H04W 4/021* | (2018.01) |
| *G08B 21/24* | (2006.01) |
| *H04W 64/00* | (2009.01) |
| *H04W 80/12* | (2009.01) |

(52) U.S. Cl.
CPC ............ *H04W 4/029* (2018.02); *G08B 21/24* (2013.01); *H04W 4/021* (2013.01); *H04W 4/023* (2013.01); *H04W 4/80* (2018.02); *H04W 64/00* (2013.01); *H04W 80/12* (2013.01)

(58) Field of Classification Search
CPC ....... H04W 4/029; H04W 4/023; H04W 4/80; H04W 4/025; H04W 84/18; H04W 64/00; H04W 4/02; H04W 4/38; H04W 4/70; H04W 12/00503; H04W 12/1206; G08B 21/24; G08B 21/0294; G08B 21/0202; G08B 21/0247; G08B 21/0453; G08B 25/00; H04L 67/22
USPC ..................... 455/456.1; 340/539.13, 539.32
See application file for complete search history.

(56) References Cited

U.S. PATENT DOCUMENTS

2013/0006816 A1* 1/2013 Nuzzi ................ G06Q 30/0261
   705/27.1
2017/0352250 A1* 12/2017 de Barros Chapiewski ................
   G08B 25/08

* cited by examiner

*Primary Examiner* — Fred A Casca
(74) *Attorney, Agent, or Firm* — Han Santos, PLLC

(57) ABSTRACT

Techniques are described herein for tracking an item of interest by implementing a search party that includes a plurality of user equipment. The technique includes receiving, from a first user equipment, a lost notification indicating that a tracking device associated with a target item is lost, the first user equipment paired with the tracking device and the tracking device having a unique tracking device identifier; obtaining a location information corresponding to a second user equipment in response to receiving the lost notification; determining based at least partially on the location information of the second user equipment whether the second user equipment is available to participate in a search party; and if the second user equipment is available to participating in the search party, transmitting a search request to the second user equipment to locate the target item, the search request comprising the unique tracking device identifier.

20 Claims, 7 Drawing Sheets

LOCATION-BASED WIRELESS TRACKING

CROSS-REFERENCE TO RELATED APPLICATIONS

This application claims priority to co-pending, commonly owned U.S. Provisional Patent Application Ser. No. 62/693,893, filed Jul. 3, 2018, entitled, "Mobile Tracking Device and Platform," which is hereby incorporated by reference in its entirety.

BACKGROUND

Various tracking systems can implement tracking devices such as Bluetooth® low energy (BLE) tracking devices to transmit signals to nearby user equipment. A tracking device can be removably attached to an item of interest to enable a user to locate the item by locating the tracking device. Additionally, a tracking device can be worn on a person or on a pet to locate the person or the pet by locating the tracking device. Generally, the tracking device can be paired to at least one user equipment such as a smartphone that enables a user to access a client application that can provide a location of the tracking device. Generally, the user equipment must be within the tracking device's communication range in order to receive signals from the tracking device. Accordingly, the user equipment generally cannot receive the tracking device's location information when it is located outside of the tracking device's communication range. Further, the tracking device can have limited compatibility such that it can only be used to transmit its location information to a paired user equipment. More particularly, the tracking device can only be used with user equipment having a specific client application installed thereon. Accordingly, locating the tracking device using only paired user equipment is limiting.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
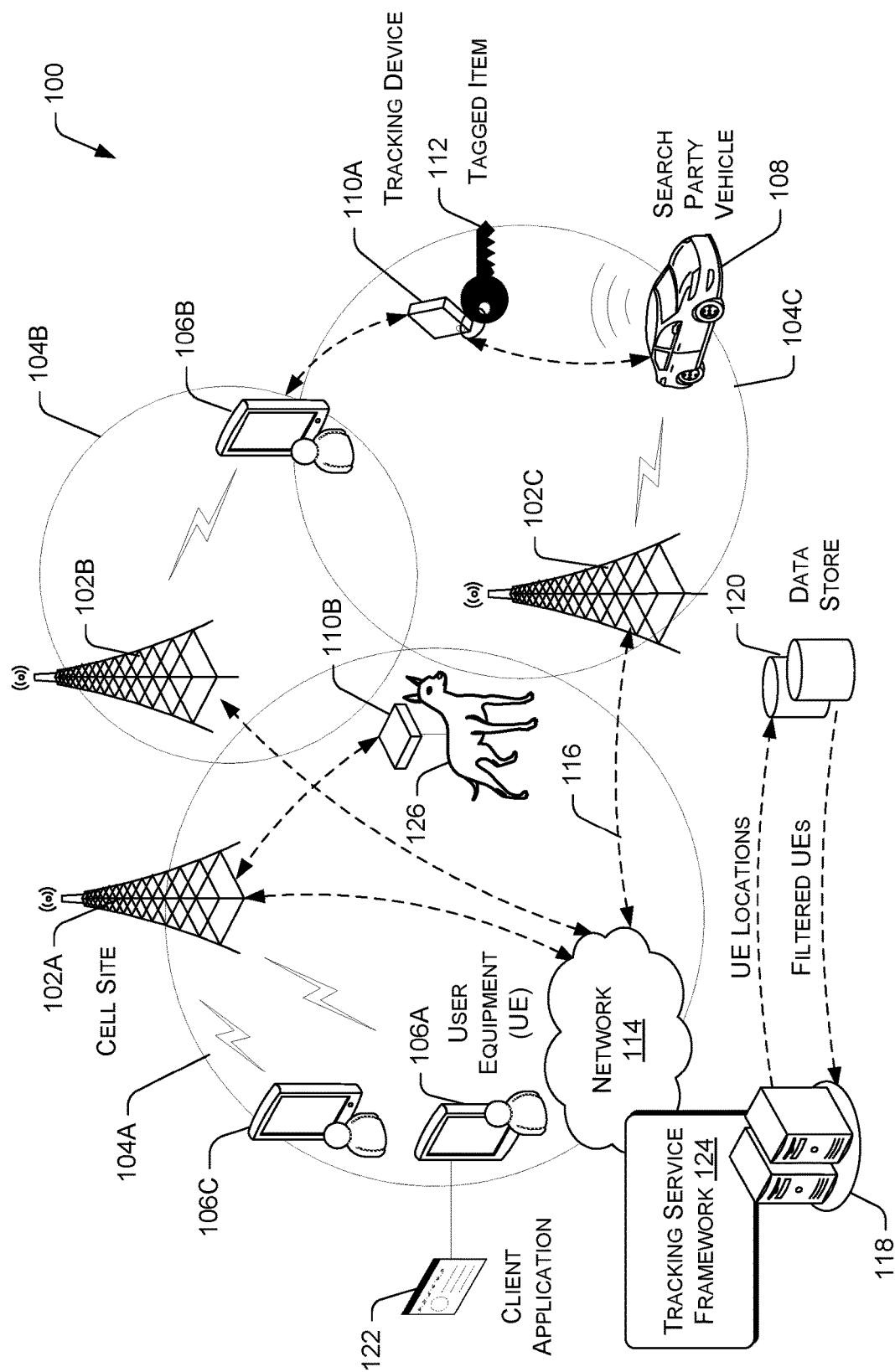
FIG. 1 illustrates an example network architecture for implementing a tracking service framework utilizing a plurality of user equipment operated by customers and non-customers of a telecommunications service provider.

This disclosure is directed to techniques for tracking an item of interest using a search party comprising a plurality of user equipment that can be selected based on a user equipment's real-time or near real-time location or other predetermined criteria as set by a user. It is noted that the tracking device can be attached to, inserted in, or embedded within an item of interest or worn on a person or on a pet. The user equipment can include a number of network-enabled devices that can be operated by a customer or a non-customer of a telecommunications service provider. The user equipment can comprise a client application or a program that is configured to track the tracking device. The application can comprise a configuration module for pairing a tracking device with a specific user equipment and a user profile. Additionally, the application can enable a user to communicate with the tracking device and/or other user equipment.

Upon determining that the tracking device is not within a communication range of a first user equipment (i.e., a paired device) that is operated by the owner of the item of interest attached to the tracking device, the tracking device can automatically enter into a lost mode to transmit signals to another nearby user equipment. The lost mode means that the tracking device may be lost, misplaced, or stolen. Additionally, or alternatively, the first user equipment can trigger an alert or a notification via the client application indicating that the item is lost. Upon determining that the tracking device is in the lost mode, a tracking service framework can assemble a search party comprising one or more nearby user equipment that selected opt-in to help recover the tracking device, and thereby the item. In various embodiments, the search party can be assembled based at least partially on a real-time or near real-time geographic location of the user equipment. For instance, the search party can comprise user equipment located within a target area or a predetermined radius of the last known location of the tracking device. The search party can be changed based on the real-time or near real-time location of the tracking device. In this way, the search party can be temporal. The search party can also be made up of the user equipment based at least partially on the owner's preference such that the search party comprises only user equipment in a preselected list. For example, the preselected list can comprise the owner's address book or the owner's contacts list.

Upon assembling the search party, the tracking service framework can transmit a push notification to the search party. The notification can include a message comprising information related to the lost item of interest, person, or pet. The message can include texts, images, or any combination thereof. In this regard, the message can comprise one or more images of the lost item, person, or pet. Additionally, the message can comprise special instructions upon recovering the lost item, person, or pet. In various embodiments, the content of the message can vary based at least partially on the privilege level associated with the user equipment. For instance, a user equipment that is associated with a higher privilege level can receive more detailed information related to the lost item of interest, person, or pet. Conversely, a user equipment that is associated with a lower privilege level can receive less detailed information related to the lost item of interest, person, or pet. In various embodiments, law enforcement and/or a preselected list of the user equipment can be associated with a higher privilege level. Additionally, the method in which the push notification is delivered can vary based at least partially on the privilege level associated with the user equipment. For instance, a user equipment that is associated with a higher privilege level can receive audible and tactile alerts that can increase in intensity and/or frequency as the user equipment becomes closer in proximity to the tracking device. Conversely, a user equipment that is associated with a lower privilege level can receive only visual alerts.

The tracking device can transmit signals on a scheduled basis or upon detecting nearby devices. Additionally, the tracking device can transmit signals based on location. Upon receiving tracking device signals, the user equipment in the search party can transmit its location, and thereby the tracking device's approximate location to the network. In various embodiments, a second tracking device can be implemented to receive tracking device signals from a first tracking device that is lost. If the tracking device, and thereby the lost item, person, or pet, is recovered, the user equipment can indicate, via the client application, that the item, person, or pet is found. The tracking service framework, upon determining that the item, person, or pet is recovered, can withdraw the push notification to the search party. Additionally, or alternatively, the search party can transmit a message indicating that the item, person, or pet is recovered.

In various embodiments, the tracking device can comprise a URL associated therewith. Additionally, the tracking device can comprise a machine-readable code (e.g., a QR code, a bar code, etc.) printed thereon. Upon recovering the tracking device, the user equipment can access the URL and scan the machine-readable code to verify that the tracking device is recovered. Upon verifying that the tracking device is recovered, the user equipment can communicate with the first user equipment via the client application. The techniques described herein may be implemented in a number of ways. Example implementations are provided below with reference to the following figures.

Example Network Architecture

FIG. 1 illustrates an example architecture 100 for implementing a tracking service framework 124 utilizing a plurality of user equipment 106A-106C comprising Bluetooth listening devices operated by customers and non-customers (i.e., subscribers or non-subscribers) of a telecommunications service provider. The user equipment 106A-106C comprises smartphones, mobile devices, personal digital assistants (PDAs) or other electronic devices having a wireless communication function that are capable of receiving input, processing the input, and generating output data. The user equipment 106A-106B is connected to a telecommunication network 114 utilizing one or more wireless cell sites 102A-102C or any other common wireless or wireline network access technologies. The user equipment 106A-106C can correspond to one or more unique device identifiers. For example, the one or more unique device identifiers can include an international mobile subscriber identity (IMSI) of the user equipment 106A-106C. A copy of the IMSI can be stored on a subscriber identity module (SIM) card of the user equipment 106A-106C.

It is noted that the user equipment 106A-106C can represent any type of consumer devices that can include computing devices (e.g., general-purpose computers) and special purpose-type devices, embedded-type devices, Internet of Things (IoT) devices, wearable-type devices, wearable devices, gaming devices, or entertainment devices such as network-enabled televisions, set-top boxes, media players, cameras, medical devices, appliances, and/or so forth. In the illustrated embodiment, the user equipment can also represent automotive computers such as vehicle control systems of a vehicle 108, the vehicle's 108 vehicle security systems, and/or an electronic key for the vehicle 108, wherein the vehicle 108 can be equipped with a connected car technology for communicating with the network 114. In this regard, references to the user equipment can include the vehicle or other devices unless the context clearly indicates otherwise. It is noted that the user equipment 106A-106C and the vehicle 108 can be operated by a customer or a non-customer of a telecommunications service provider. Thus, the one or more user equipment 106A-106C and the vehicle 108 can be a customer's device or a non-customer's device.

The cell sites 102A-102C can connect to the network 114 via a backhaul link 116 or other distributed portions of the network 114. The backhaul link 116 may be configured to employ any common wireline communication technology, including but not limited to, optical fiber, coaxial cable, twisted pair cable, Ethernet cable, and powerline cable, along with any common wireless communication technology. The network 114 can be a cellular network that implements 2G, 3G, 4G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), WiMax, and Wi-Fi access technologies.

The network 114 comprises a tracking service framework 124 that can be executed at least partially on a server 118. The server 118 may include general-purpose computers, such as desktop computers, tablet computers, laptop computers, servers (e.g., on-premise servers), or other electronic devices that are capable of receiving input, processing the input, and generating output data. The server 118 may be operated by a telecommunication service provider or a third-party entity that is working with the telecommunication service provider. The server 118 may store data in a distributed storage system, in which data may be stored for long periods of time and replicated to guarantee reliability. Accordingly, the server 118 may provide data and processing redundancy, in which data processing and data storage may be scaled in response to demand. Further, in a networked deployment, new servers may be added. Thus, the server 118 can include a plurality of physical machines that may be grouped together and presented as a single computing system. Each physical machine of the plurality of physical machines may comprise a node in a cluster. The server 118 may also be in the form of virtual machines, such as virtual engines (VE) and virtual private servers (VPS).

Without limitation, the tracking devices 110A-11B can comprise a transceiver, a sensor, a processor, a memory, a communication interface, and other components for communicating its real-time or near real-time location to the network 114, one or more user equipment 106A-106C, and/or the vehicle 108. In various embodiments, the tracking devices 110A-110B can communicate using various short-range communication techniques (e.g., Bluetooth® wireless technology) or one or more radio access technologies (RAT). Additionally, the tracking devices 110A-110B can communicate with one or more components of the architecture using a cellular communications protocol. A first tracking device 110A can be attached to an item of interest 112 such as a key, a purse, a wallet, or another a valuable item. In this way, the user can locate the tagged item 112 by locating the first tracking device 110A. The first tracking device 110A can be attached to the tagged item 112 in a number of ways. For example, the first tracking device 110A can be attached to the exterior of the tagged item 112 or inserted into or embedded within the tagged item 112 such that the first tracking device 110A is structurally integral to the tagged item 112.

A second tracking device 110B can be attached to or embedded within a pet collar that can be worn on a pet 126. In various embodiments, the second tracking device 110B can comprise a microchip implant that can be placed under the skin of the pet 126. Further, it is noted that a tracking device can be worn on a person. For example, the tracking device can be integral to jewelry, a watch, a smartwatch, and/or so forth. Additionally, the tracking device can comprise a human microchip implant that can be placed subdermally.

The first tracking device 110A and the second tracking device 110B can be associated with the user of the first user equipment 106A. In one example, the first user equipment 106A can be paired to the tracking devices 110A-110B using a client application 122 installed on the first user equipment 106A. Various pairing methods (e.g., Bluetooth® pairing) may be used. For example, the first user equipment 106A can receive a unique tracking device identifier corresponding to the tracking devices 110A-110B such as an international mobile equipment identity (IMEI) number or a Bluetooth® advertising protocol of the tracking devices 110A-110B. Upon obtaining the IMEI number of the tracking devices 110A-110B, the first user equipment 106A may register the tracking devices 110A-110B with the tracking service framework 124, which then enables the tracking devices 110A-110B to communicate with the network 114.

The client application 122 can provide a user interface (e.g., a graphical user interface (GUI)) for setting up and managing a user profile, configuring the tracking devices 110A-110B, performing a local search for the tracking devices 110A-110B (i.e., attached to the tagged item 112 or the pet 126), and/or so forth. Additionally, the client application 122 can enable each of the tracking devices 110A-110B to be associated with a specific tagged item 112 or pet 126. In various embodiments, the client application 122 enables the tracking devices 110A-110B to forget a tagged item or a pet upon associating itself with a newly tagged item or pet.

The user profile can comprise one or more unique device identifiers of the user equipment and one or more subscriber indicia of a user associated with the first user equipment 106A. The subscriber indicia can include a user identifier, an IMEI number of the first user equipment 106A, or other indicia such as EID to allow a mobile network operator (MNO) of the network 114 to identify the user as a current subscriber. In this way, the MNO can associate the unique device identifier of the tracking devices 110A-110B with a current subscriber account for billing or for providing other services associated with the use of the tracking devices 110A-110B.

In various embodiments, the GUI of the client application 122 can display a map and/or coordinates showing the last known location of the tracking devices 110A-110B in order to inform the user of the most recent location of the tagged item 112 or the pet 126. Additionally, the client application 122 can provide a location history of the tagged item 112 or the pet 126 by displaying the location of the tagged item 112 or the pet 126 at different dates and times. In this way, the client application 122 enables the user to track the movement of the tagged item 112 or the pet 126. The client application 122 can further enable the user to configure various settings such as notification and alert settings, display settings, communication settings, and/or so forth.

If one or more of the tracking devices 110A-110B, and thus the tagged item 112 or the pet 126, is outside of the communication range of the first user equipment 106A, the one or more tracking devices 110A-110B can automatically enter into a lost mode. Additionally, or alternatively, the one or more tracking devices 110A-110B can automatically enter into the lost mode when located outside of a predetermined radius of the first user equipment 106A. For instance, the tracking devices 110A-110B can automatically enter into the lost mode when it is located outside of a building.

In various embodiments, the tracking devices 110A-110B can enter into a caution mode when it is located outside of a first predetermined radius of the first user equipment 106A, and enter into the lost mode when it is located outside of a second predetermined radius of the first user equipment 106A. For example, the first tracking device 110A can automatically enter into the caution mode when it is located outside of a room and then enter into the lost mode when it is located outside of a building. In another example, the second tracking device 110B can enter into the caution mode when a pet exits a predefined geofence, and then enter into a lost mode when a pet travels more than one block away from the house. In various embodiments, the client application 122 can provide an interface to enable the user to define one or more predefined radius and geofences associated with the tracking devices 110A-110B.

When the one or more tracking devices 110A-110B enter a caution mode, the first user equipment 106A via the client application 122 can provide a reminder or an alert to the user to check the user's surroundings for the tagged item 112 or the pet 126 that is attached to the one or more tracking devices 110A-110B. In this way, the user is provided with the opportunity to ensure that the tagged item 112 or the pet 126 is in the user's possession before moving further away from the one or more tracking devices 110A-110B. When the one or more tracking devices 110A-110B enter a lost mode, the first user equipment 106A via the client application 122 can provide a notification or a second alert to the user indicating that the one or more tracking devices 110A-110B may be lost. In various embodiments, the tracking service framework 124 can communicate with the first user equipment 106A based on the location of the tracking devices 110A-110B. In this way, various reminders, alerts, and/or notifications can be provided via the client application 122 in an escalated manner.

Additionally, or alternatively, if the tagged item 112 or the pet 126 becomes lost or stolen, the user can manually report that the tagged item 112 or the pet 126 is missing, via the client application 122, which can trigger the one or more tracking devices 110A-110B to enter into a lost mode. Upon determining that the one or more tracking devices 110A-110B are lost, the client application 122 can notify the tracking service framework 124 that the one or more tracking devices 110A-110B may be missing. In various embodiments, if the one or more tracking devices 110A-110B automatically enter a lost mode, the user, via the client application 122, can manually return the one or more tracking devices 110A-110B to a normal status. In this way, the tracking devices 110A-110B need not enter a lost mode if the user knows the whereabouts of the tagged item 112 or the pet 126 even when the one or more tracking devices 110A-110B are located outside of a predefined geofence or a predetermined radius of the first user equipment 106A.

The tracking service framework 124 can assemble a search party comprising one or more user equipment or vehicles to help recover the one or more tracking devices 110A-110B that are in a lost mode. The user equipment 106B-106C or the vehicle's 108 automotive computer in the search party can also comprise the client application 122 installed thereon. Additionally, or alternatively, the user equipment 106B-106C and/or the vehicle's 108 automotive computers can include a compatible software application or a program with a background service for passively listening for tracking device signals from the one or more nearby tracking devices 110A-110B.

In one example, the search party can be location-based. The location of the one or more tracking devices 110A-110B, one or more user equipment 106B-106C, and/or vehicle 108 can be determined using various network-based techniques, handset-based techniques, SIM-based techniques, Wi-Fi techniques, and/or so forth. Additionally, the location information can be obtained using a global positioning system (GPS). The tracking service framework 124 can identify one or more user equipment 106B-106C or vehicle 108 that are located within a predetermined distance of the one or more tracking devices 110A-110B or that are located in a target geographical area. The target geographical area can be defined by a user via the client application 122.

For example, the search party for recovering the first tracking device 110A can include the second user equipment 106B and the vehicle 108 so long as the second user equipment 106B and the vehicle 108 are located within a predetermined radius of the last known location of the first tracking device 110A. In another example, the search party for recovering the first tracking device 110A can include the vehicle 108 so long as the first tracking device 110A and the vehicle 108 are both located in the same target area 104C. If the first tracking device 110A moves to a different target area 104B, the tracking service framework 124 can assemble a new search party comprising the second user equipment 106B. In this way, the search party can be temporal, depending upon embodiments.

The location information corresponding to the tracking devices 110A-110B, the vehicle 108, and/or the one or more user equipment 106A-106C can be stored in a cloud service or a data store 120 that is in communication with the tracking service framework 124. In various embodiments, the data store 120 can comprise a data management layer that includes software utilities for facilitating the acquisition, processing, storing, reporting, and analysis of data from multiple data sources such as the user equipment 106A-106C, the vehicle 108, and/or so forth. In various embodiments, the data store 120 can interface with an API for providing data access. Additionally, the data store 120 can store and maintain user profiles associated with one or more users of the client application 122 and/or the tracking service framework 124.

In various embodiments, the data store 120 can include a register of user equipment 106B-106C or vehicles 108 that has selected opt-in to participate in a search party. A user equipment 106B-106C or a vehicle 108 can opt in or opt out to participate in a search party depending on the time of day or location. The client application 122 can provide an interface for enabling a user to opt in or opt out of a search party. For example, a user equipment 106B-106C or a vehicle 108 can opt out to participate in a search party during normal business hours or while the user of the user equipment 106B-106C is at work. Additionally, a user equipment 106B-106C can opt out to participate in a search party while the user of the user equipment 106B-106C is traveling. The tracking service framework 124 can retrieve from the data store 120 a filtered list of user equipment 106B-106C and the vehicle 108 that are eligible or available to be in a search party based on the real-time or near real-time location of the user equipment 106B-106C and the vehicle 108 with respect to the one or more tracking devices 110A-110B.

Upon assembling a search party, the tracking service framework 124 can provide a push notification to the one or more user equipment in the search party. The push notification can include a request to participate in a search for a tagged item 112 or a pet 126 and commands to listen for transmitted signals from the one or more tracking devices 110A-110B. The push notification can include a message comprising a description of the lost item of interest, person, or pet. The message also can include texts, images, or any combination thereof. For instance, the message can comprise one or more images of the lost item, person, or pet.

Additionally, the message can comprise special instructions upon recovering the lost item, person, or pet. For example, the message can include the return address or contact information. In various embodiments, the content of the message and/or the method in which the push notification is delivered to each user equipment can vary based at least partially on the privilege level associated with each of the user equipment in the search party. If a new search party is assembled, the push notification to the original or the previously assembled search party can be withdrawn. Additionally, or alternatively, a second push notification can be provided to the original or the previously assembled search party to indicate that the user of the user equipment in the search party need no longer participate in the search.

The tracking devices 110A-110B can transmit signals in accordance with a transmission scheme. The tracking device signals can include tracking device identifiers corresponding to the tracking devices 110A-110B and the real-time or near real-time location of the tracking devices 110A-110B. In various embodiments, the tracking device signals can also include messages such as information related to the user equipment paired to the tracking device 110A-110B (i.e., the first user equipment 106A). When the user equipment 106B-106C and/or other listening devices (e.g., vehicle 108) in the search party receive signals from the one or more tracking devices 110A-110B, the user equipment 106B-106C and/or other listening devices can transmit its location information, and thereby the one or more tracking devices' 110A-110B location or approximate location to the tracking service framework 124. Additionally, the user equipment 106B-106C and/or other listening devices can transmit the tracking device identifier of the one or more tracking devices 110A-110B that transmitted the tracking device signals. The transmission can be timestamped such that the location information can correspond to different dates and times. In this way, if the tracking devices 110A-110B moves to another location, the one or more tracking devices' 110A-110B movements can be tracked.

In various embodiments, the user equipment 106B-106C and/or other listening devices can provide an alert or a notification to indicate that the user equipment 106B-106C is located near one or more tracking devices 110A-110B. Conversely, the one or more tracking devices 110A-110B can provide an alert or a notification upon detecting one or more nearby user equipment 106B-106C in the search party. The user equipment 106B-106C and the tracking devices 110A-110B can communicate based at least partially on the privilege level or the authentication level associated with the user equipment 106B-106C. Accordingly, the alert or the notification can vary based at least partially on the privilege level associated with the user equipment 106B-106C. In one example, the user equipment 106B-106C can transmit one or more messages to the tracking devices 110A-110B in response to receiving tracking device signals from the one or more tracking devices 110A-110B, wherein the messages can be limited to indicate or acknowledge that the one or more user equipment 106B-106C received the tracking device signals. In another example, the user equipment 106B-106C can transmit a specific set of commands or instructions to the one or more tracking devices 110A-110B.

The client application 122 may provide an interface for enabling a user to configure privilege levels and settings. As noted above, privilege levels determine the content of the message and/or the method in which the push notification is delivered to each user equipment in a search party. Additionally, the privilege levels determine which user equipment and/or listening devices in a search party are allowed to communicate with which tracking devices 110A-110B, and how the user equipment and/or listening devices should be allowed to communicate with the one or more tracking devices 110A-110B. In this way, not all user equipment and/or listening devices have the same level of access to the tracking devices 110A-110B and different privilege levels can be applied for different tracking devices 110A-110B.

The tracking service framework 124 can be configured to implement any number of privilege levels. The privilege levels can correspond to a numerical value. In one example, a first privilege level or the highest privilege level may enable a user equipment to transmit many more commands to one or more tracking devices 110A-110B than a second privilege level or a lower privilege level. Privilege levels can be manually assigned or automatically determined. For instance, a user equipment that is associated with a phone number and/or a subscriber in the address book that is stored on the first user equipment 106A can be associated with a first privilege level. Additionally, a user equipment that comprises specific types of devices (e.g., vehicles) can be associated with a second privilege level. Further, a user equipment that is associated with law enforcement, government agencies, and/or public service organizations can be automatically associated with a third privilege level.

A user equipment that is assigned the first privilege level can emit audible sounds (e.g., beeps), provide tactile notifications (e.g., vibrations), and/or display visual indicators (e.g., flashing lights) upon receiving a push notification for an incoming search request or when the one or more tracking devices 110A-110B are located nearby. The user equipment that is associated with the first privilege level can also transmit secure commands and retrieve data (e.g., location information) from the one or more tracking devices 110A-110B. In another example, a user equipment that is assigned the second privilege level can display only visual indicators upon receiving a push notification for an incoming search request or when the one or more tracking devices 110A-110B are located nearby. In yet another example, a user equipment that is assigned the third privilege level can receive messages containing sensitive content (e.g., medical information) upon receiving the push notification for an incoming search request.

If there are no nearby user equipment 106B-106C, the tracking devices 110A-110B can continue transmitting tracking device signals. Additionally, or alternatively, the tracking devices 110A-110B can transmit tracking device signals only when it detects the presence of a user equipment 106B-106C in its vicinity in order to conserve its battery power. In various embodiments, the tracking devices 110A-110B can provide a transmission scheme such that the communication rate can be slowed when no motion is detected, or based on time of the day or location. Additionally, the tracking devices 110A-110B can prioritize communication with certain listening devices. For instance, the tracking devices 110A-110B can transmit tracking device signals to smartphones 106B-106C before transmitting signals to vehicles 108. Similarly, the tracking devices 110A-110B can transmit tracking devices to user equipment assigned to the first privilege level before transmitting signals to user equipment assigned to the second privilege level.

In various embodiments, the first tracking device 110A can transmit tracking device signals to the second tracking device 110B. Upon receiving the tracking device signals from the first tracking device 110A, the second tracking device 110B can transmit the location information of the first tracking device 110A to the tracking service framework 124. Additionally, or alternatively, the second tracking device 110B can transmit its location information, and thereby the approximate location of the first tracking device 110A. The tracking service framework 124 can, in turn, provide the location information to the first user equipment 106A to enable the user of the first user equipment 106A to recover the first tracking device 110A.

Upon receiving location information corresponding to the one or more tracking devices 110A-110B, the tracking service framework 124 is configured to pass on the location information of the one or more tracking devices 110A-110B to the first user equipment 106A that is paired to the tracking devices 110A-110B. More particularly, the tracking service framework 124 can identify the first user equipment 106A that is associated with the tracking devices 110A-110B by referencing the unique identifier corresponding to the tracking devices 110A-110B and the first user equipment 106A. The user of the first user equipment 106A can use the location information of the one or more tracking devices 110A-110B to recover the tagged item 112 or the pet 126. When the tagged item 112 or the pet 126 is recovered, the first user equipment 106A can indicate via the client application 122 that the tagged item 112 or the pet 126 is recovered. This process can trigger the one or more tracking devices 110A-110B to enter into a normal mode. The normal mode means that the tracking device is recovered or found. The tracking service framework 124 can transmit a new push notification or a message indicating that the tagged item 112 or the pet 126 has been found.

In various embodiments, one or more user equipment 106B-106C and/or other listening devices (e.g., vehicle 108) can communicate with the first user equipment 106A upon recovering the tagged item 112 or the pet 126. In this regard, the client application 122 can provide a messaging interface. In order to verify that the tagged item 112 or the pet 126 has been found, one or more user equipment 106B-106C can access a URL (e.g., via the client application 122 or a web browser) that is associated with the one or more tracking devices 110A-110B attached to the tagged item 112 or the pet 126. Upon accessing the URL, a user can be prompted to enter a code or scan a machine-readable code (e.g., a QR code, a barcode, etc.) that may be printed on the tracking device. In various embodiments, the client application 122 on the user equipment 106B-106C may provide an interface for entering the code or scanning the machine-readable code. Upon verifying the code, the tracking service framework 124 may enable the one or more user equipment 106B-106C to transmit messages to and/or receive messages from the first user equipment 106A via the messaging interface of the client application 122.

Example Computing Device Components

Figure 2:
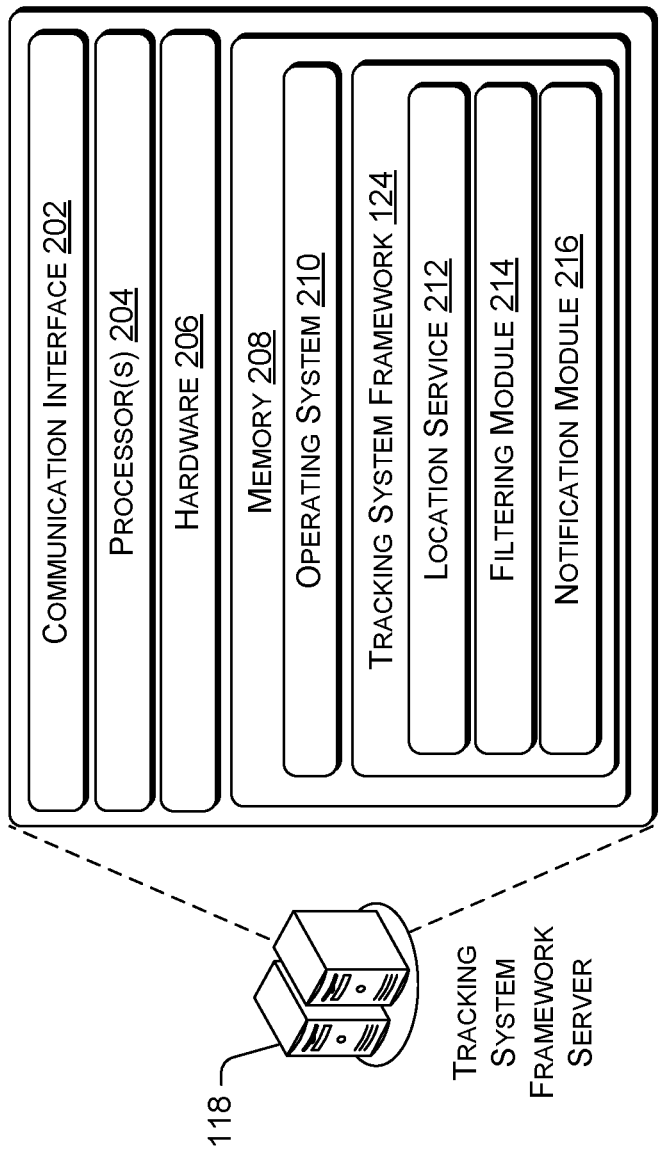
FIG. 2 is a block diagram showing various components of an illustrative computing device that implements a tracking service framework.

FIG. 2 is a block diagram showing various components of an illustrative computing device, wherein the computing device can comprise a tracking system framework server 118. It is noted that the server 118 as described herein can operate with more or fewer of the components shown herein. Additionally, the server 118 as shown herein or portions thereof can serve as a representation of one or more of the computing devices of the present system.

The server 118 may include a communication interface 202, one or more processors 204, hardware 206, and memory 208. The communication interface 202 may include wireless and/or wired communication components that enable server 118 to transmit data to and receive data from other networked devices. In at least one example, the one or more processor(s) 204 may be a central processing unit(s) (CPU), graphics processing unit(s) (GPU), both a CPU and GPU or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 204 may also be responsible for executing all computer applications stored in the memory, which can be associated with common types of volatile (RAM) and/or nonvolatile (ROM) memory. The hardware 206 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 208 may also include a firewall. In some embodiments, the firewall may be implemented as hardware 206 in the server 118.

The processors 204 and the memory 208 of the server 118 may implement an operating system 210 and a tracking service framework 124. The tracking service framework 124 includes a location service 212, a filtering module 214, and a notification module 216. The operating system 210 may include components that enable the server 118 to receive and transmit data via various interfaces (e.g., user controls, a communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The location service 212 is configured to determine the real-time or near real-time location of the tracking device and one or more user equipment. In various embodiments, the location information can be obtained using network-based techniques, handset-based techniques, SIM-based techniques, Wi-Fi techniques, and/or so forth. Additionally, the location information can be obtained using a global positioning system (GPS). The location information can comprise a crowdsourced information and/or retrieved from dedicated listening devices. The location information can be timestamped and can include a device identifier corresponding to a specific tracking device or a user equipment. In various embodiments, the location information can be used to detect various temporal patterns of movement. The location information can be logged and stored in a data store.

The filtering module 214 is configured to identify one or more user equipment and/or listening devices that are eligible or available to participate in a search party. Each of the one or more user equipment corresponds to a unique identifier that can include IMSI, EID, and/or so forth. The unique identifier of the user equipment can correlate to a user account associated with one or more subscribers of a telecommunications service provider. In one example, the filtering module 214 is configured to identify one or more user equipment that has selected to opt-in to participate in a search party. Based at least partially on the location information of the opted-in user equipment, the filtering module 214 is configured to identify one or more user equipment that is located within a predetermined radius of the last known location of a tracking device that is in a lost mode. Additionally, or alternatively, the filtering module 214 is configured to identify one or more user equipment that is located in a target area.

Upon identifying one or more user equipment that is located within a predetermined radius of the last known location of a tracking device or that is located in a target area, the filtering module 214 is configured to assemble a search party. The filtering module 214 is configured to continuously monitor the location information of one or more user equipment in order to determine whether the one or more user equipment is eligible to participate in the search party. If the one or more user equipment is not located in a target area or within a predetermined radius of the last known location of a tracking device, the filtering module 214 can assemble a new search party.

The notification module 216 is configured to provide, alerts, messages, and/or push notifications to one or more user equipment and/or tracking devices. The push notifications to one or more user equipment in a search party can include a message comprising a request to participate in a search for a lost item of interest, person, or a pet. In various embodiments, the message can prompt a user of a user equipment to confirm his or her participation in the search or decline the participation. The content of the message can also include information related to the lost item of interest, person, or pet. In various embodiments, the notification module 216 can determine the type of content to display in the message based at least partially on a privilege level associated with a user equipment in a search party. Upon deploying a search party, the notification module 216 can provide notifications or alerts to one or more user equipment indicating the last known location of a tracking device.

Additionally, the notification module 216 can facilitate communication between one or more user equipment and a tracking device. For instance, the notification module 216 can enable the tracking device to provide notifications or alerts to a user equipment indicating that the tracking device is in the vicinity of the user equipment.

Example Processes

FIGS. 3 through 7 present illustrative processes 300-700 for locating target items using a network of second user equipment comprising a plurality of user equipment. The processes 300-700 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-700 are described with reference to the architecture 100 of FIG. 1 and the block diagram 200 of FIG. 2.

Figure 3:
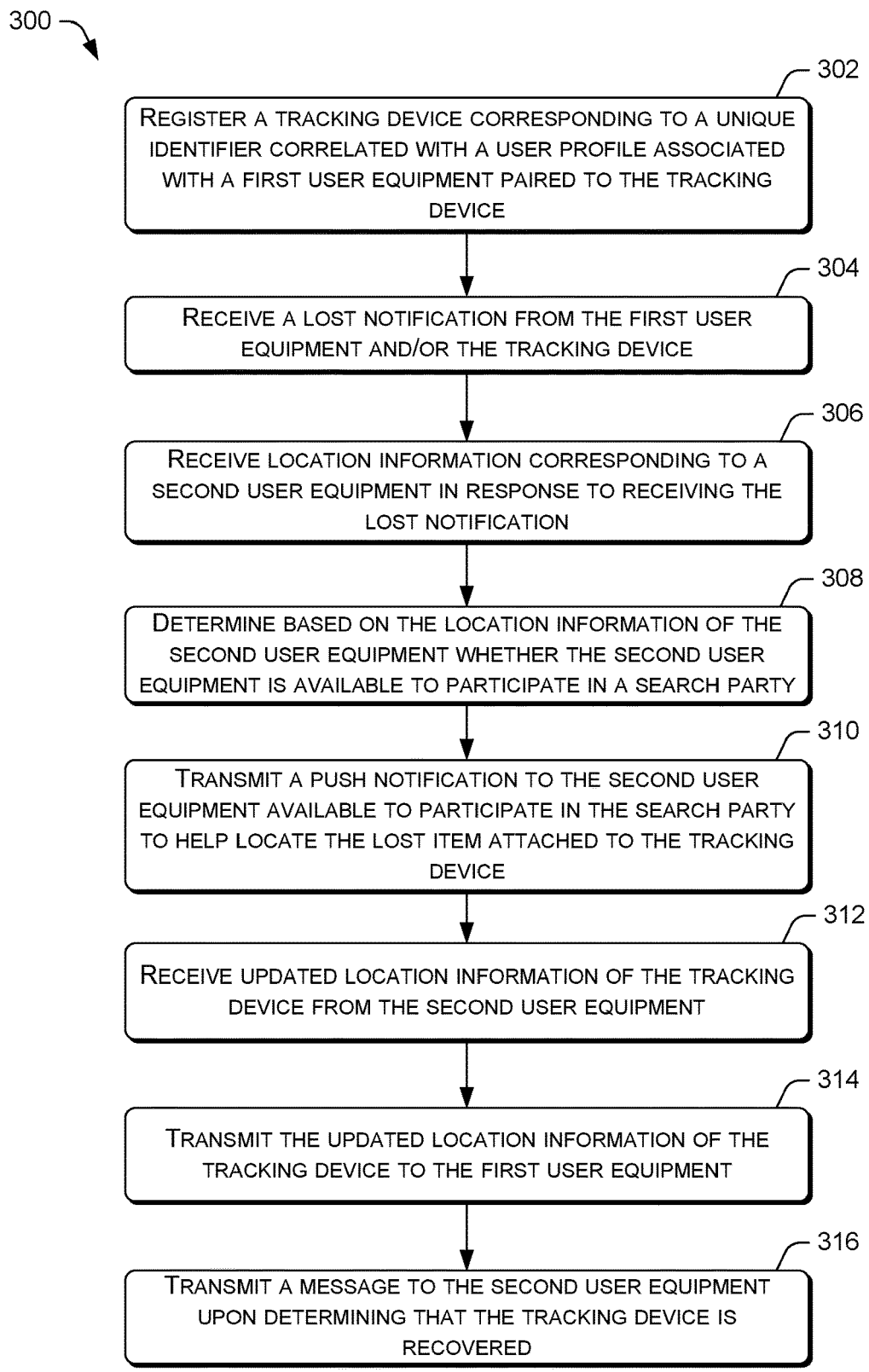
FIG. 3 is a flow diagram of an example process for tracking the location of a tracking device utilizing various user equipment in communication with a telecommunications network.

FIG. 3 is a flow diagram of an example process 300 for tracking the location of a tracking device utilizing various user equipment in communication with a telecommunications network, from a perspective of the tracking service framework. At block 302, the tracking service framework registers a tracking device in response to receiving a registration request from a first user equipment, wherein the request can include a unique tracking device identifier corresponding to the tracking device. The tracking device identifier can correlate to a user profile associated with the first user equipment. At block 304, the tracking service framework receives a lost item notification from the first user equipment and/or the tracking device. The tracking device can automatically enter a lost mode when it is located more than a predetermined distance away from the user equipment. Additionally, or alternatively, the user equipment can manually provide a lost notification to indicate that the tracking device, and thereby a target item, is lost.

At block 306, the tracking service framework, via the location service, receives real-time or near real-time location information corresponding to a second user equipment in response to receiving the lost notification. At block 308, the tracking service framework, via the filtering module, determines based on the location information of the second user equipment whether the second user equipment is available to participate in a search party. In this regard, the second user equipment is available to participate in the search party if the second user equipment is located within a predetermined radius of the last known location of the tracking device or located in a target area. The target area can be an area that is designated by a user. The target area may also be an area having a predetermined radius of the last known location of the tracking device. The second user equipment can opt in to participate in the search party. At block 310, the tracking service framework, via the notification module, transmits a push notification to the second user equipment that is available to participate in the search party. In this regard, if the user equipment is in the target area but has selected opt out, the user equipment will not receive the push notification. In one example, a user equipment can automatically opt in or opt out on a scheduled basis. The push notification can include a message requesting the user equipment to help locate the item.

At block 312, upon determining that one or more user equipment in the search party has located the tracking device, the tracking service framework, via the location service, can receive updated location information of the second user equipment in the search party, and therefore the updated location information of the tracking device. At block 314, the tracking service framework, via the notification module, can transmit the updated location information corresponding to the identifier of the tracking device to the first user equipment. The user of the first user equipment can use the updated location information of the tracking device to find the lost item. In various embodiments, the tracking service framework can receive a confirmation from the user equipment indicating that the tracking device is recovered. At block 316, the tracking service framework, via the notification module, transmits a message to the second user equipment in the search party upon determining that the tracking device is recovered. The message can indicate that the tracking device, and therefore the lost item has been found.

Figure 4:
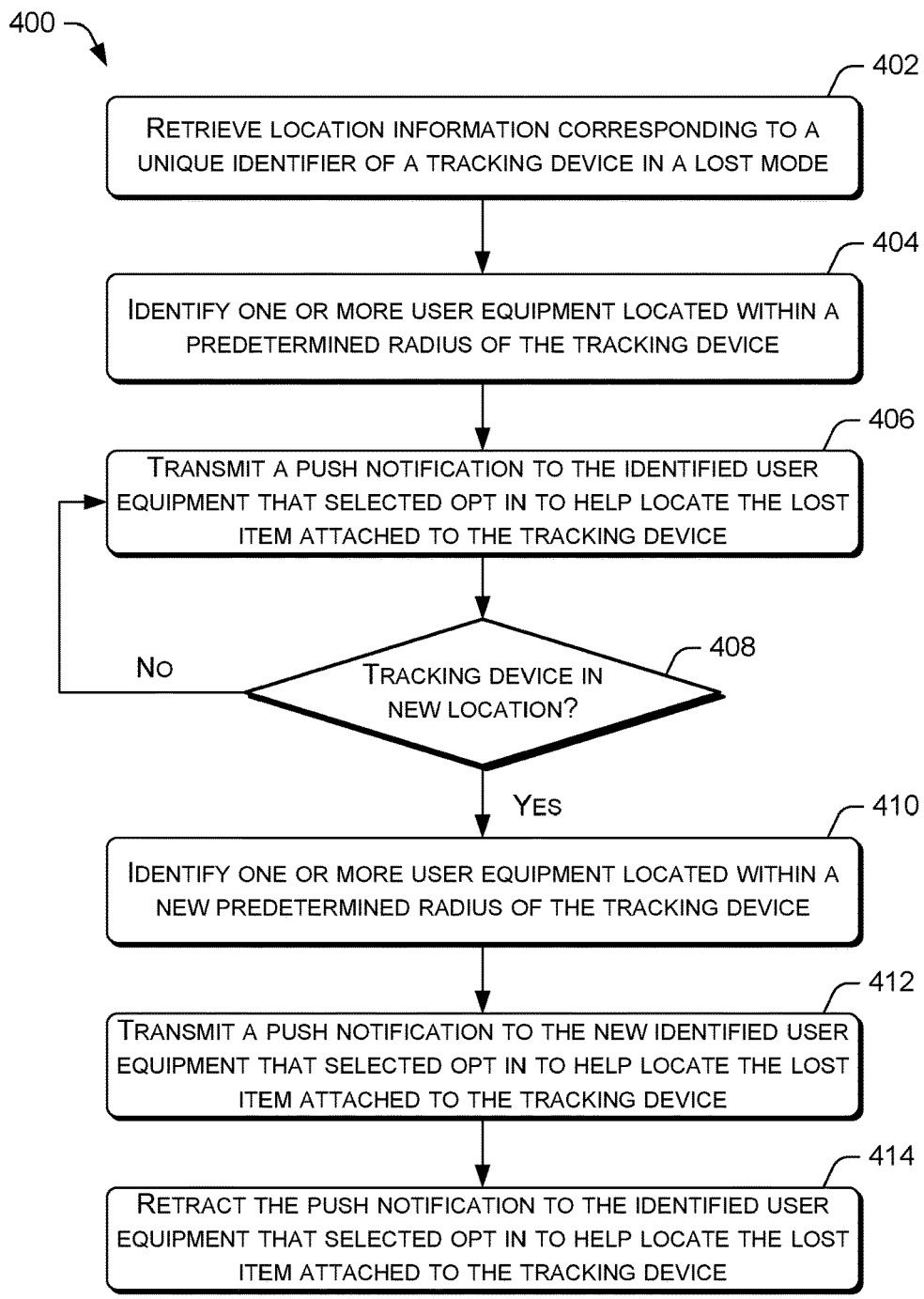
FIG. 4 is a flow diagram of an example process for tracking the location of a mobile tracking device.

FIG. 4 is a flow diagram of an example process 400 for tracking the location of a mobile tracking device. At block 402, the tracking service framework, via the location service, retrieves location information corresponding to a unique identifier of a tracking device in a lost mode. At block 404, the tracking service framework identifies one or more user equipment located within a predetermined radius of the last known location of the tracking device or one or more user equipment located in a target area. At block 406, the tracking service framework, via the notification module, transmits a push notification to the identified user equipment that selected opt-in to help locate the lost item attached to the tracking device. The user equipment can comprise a search party.

At decision block 408, the tracking service framework, via the location service, determines whether the tracking device is in a new location. If the tracking device is in a new location ("yes" response from the decision block 408), the tracking service framework, via the filtering module, identifies one or more user equipment located within a new predetermined radius of the tracking device or located within a new target area, as indicated in block 410. If the tracking device is not in a new location ("no" response from the decision block 408), the tracking service framework continues transmitting the push notification to the search party as indicated in block 406. At block 412, the tracking service framework, via the notification module, transmits a push notification to the new identified user equipment that selected opt-in to help locate the lost item attached to the tracking device. At block 414, the tracking service framework retracts the push notification to the originally identified user equipment that selected opt-in to help locate the lost item attached to the tracking device. In various embodiments, the tracking service framework can transmit a new message or a new push notification indicating that the search request has been withdrawn.

Figure 5:
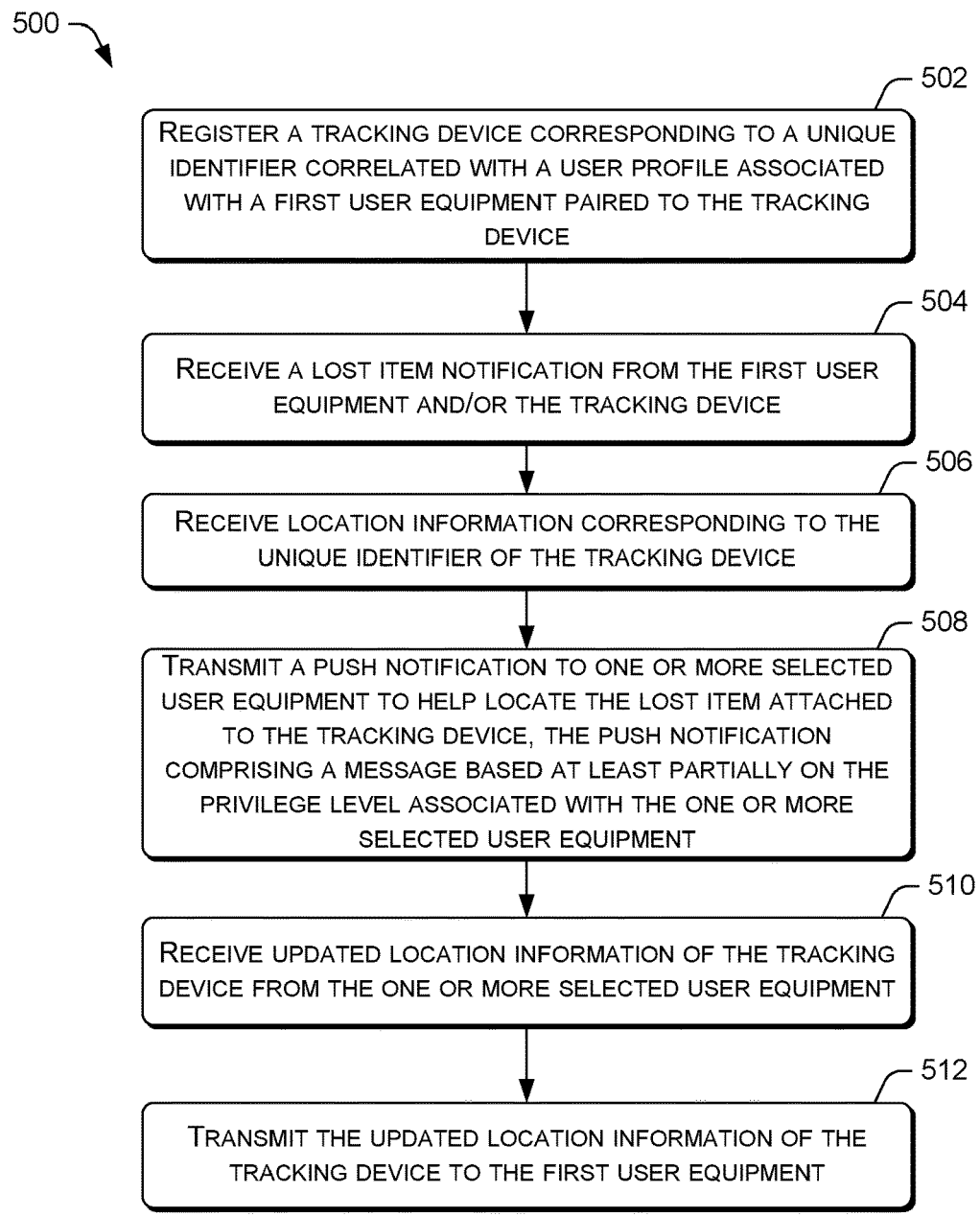
FIG. 5 is a flow diagram of an example process for tracking the location of a tracking device using selected user equipment, wherein each user equipment is associated with a privilege level.

FIG. 5 is a flow diagram of an example process 500 to track the location of a tracking device using selected user equipment, wherein each user equipment is associated with a privilege level. At block 502, the tracking service framework registers a tracking device corresponding to a unique tracking device identifier correlated with a user profile associated with a first user equipment paired to the tracking device. At block 504, the tracking service framework receives a lost item notification from the first user equipment and/or the tracking device. At block 506, the tracking service framework, via the location service, retrieves location information corresponding to the unique identifier of the tracking device.

At block 508, the tracking service framework, via the notification module, transmits a push notification to one or more selected user equipment to help locate the lost item attached to the tracking device, the push notification comprising a message based at least partially on the privilege level associated with the one or more selected user equipment. For example, a first user equipment that is associated with a high privilege level can receive a more detailed message compared to a second user equipment that is associated with a low privilege level. At block 510, the tracking service framework, via the location service, receives updated location information corresponding to the identifier of the tracking device from the one or more selected user equipment. At block 512, the tracking service framework, via the notification module, transmits the updated location information corresponding to the identifier of the tracking device to the first user equipment.

Figure 6:
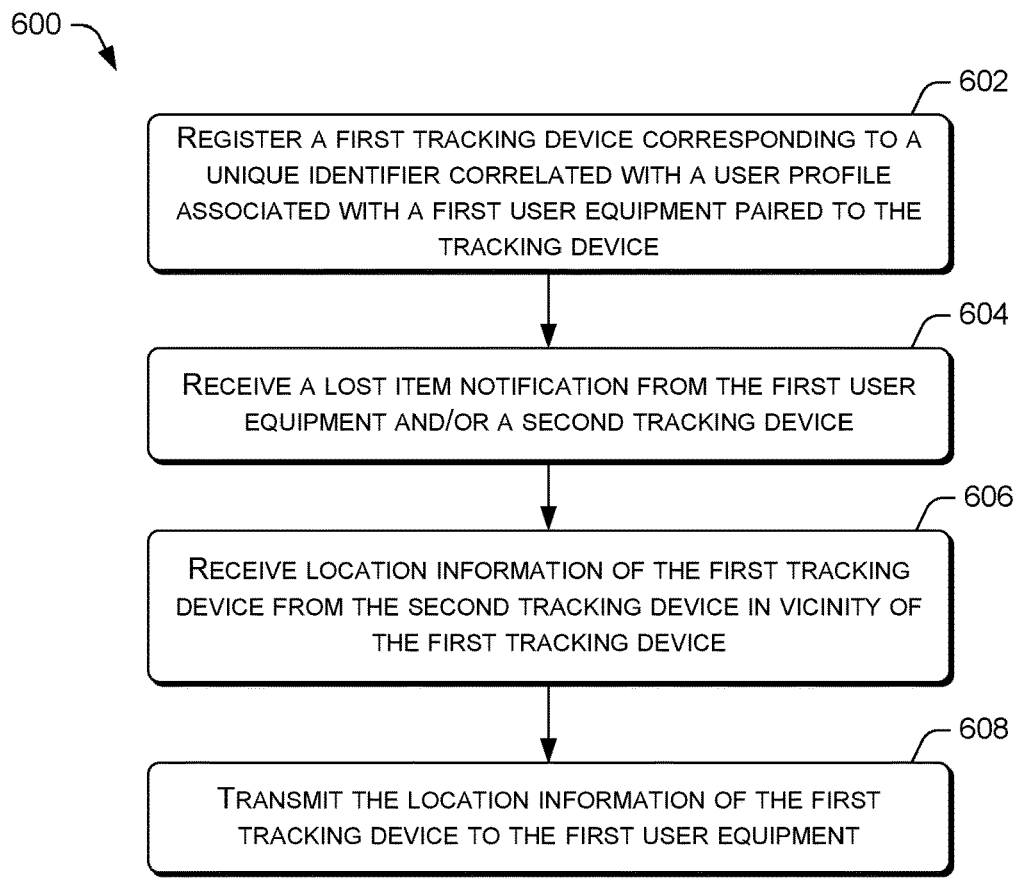
FIG. 6 is a flow diagram of an example process for tracking the location of a first tracking device using a second tracking device.

FIG. 6 is a flow diagram of an example process 600 for tracking the location of a first tracking device using a second tracking device. At block 602, the tracking service framework registers a first tracking device corresponding to a unique tracking device identifier correlated with a user profile associated with a first user equipment paired to the tracking device. At block 604, the tracking service framework receives a lost item notification from the first user equipment and/or the second tracking device. At block 606, the tracking service framework, via the location service, receives location information of the first tracking device from the second tracking device in the vicinity of the first tracking device. In various embodiments, the second tracking device can also be correlated with the same user profile associated with the at least one user equipment. Alternatively, the second tracking device can be correlated with a different user profile associated with a different user equipment. At block 608, the tracking service framework, via the notification module, transmits the location information of the first tracking device to the first user equipment. In this way, the first tracking device can be located using one or more tracking devices.

Figure 7:
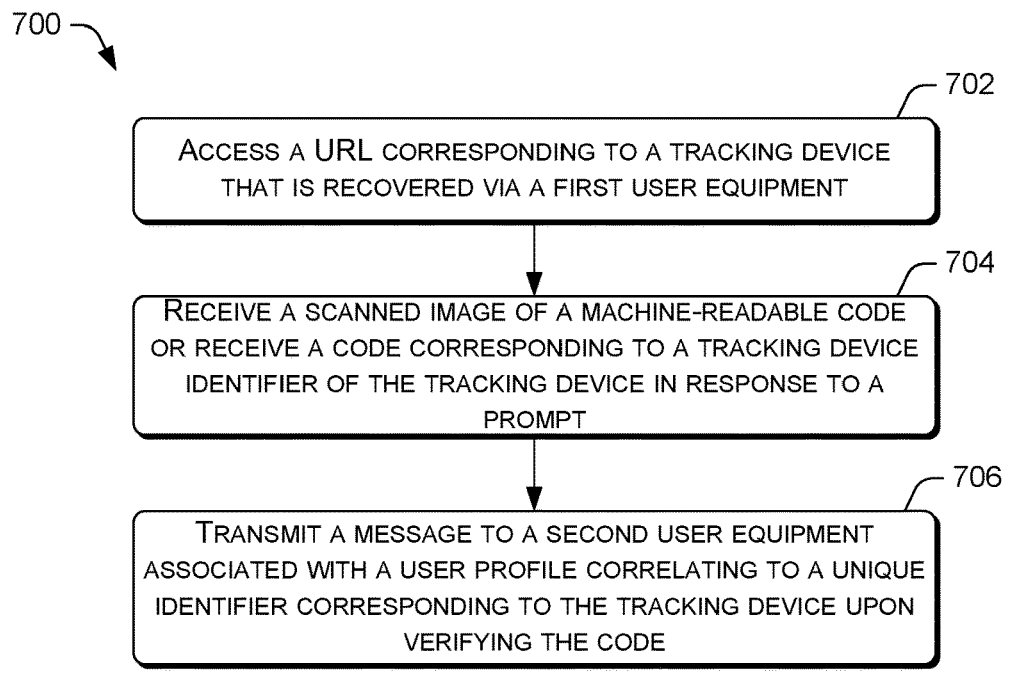
FIG. 7 is a flow diagram of an example process for enabling a first user equipment to communicate with a second user equipment upon recovering a tracking device.

FIG. 7 is a flow diagram of an example process 700 for enabling a first user equipment to communicate with a second user equipment upon recovering a tracking device that is paired to the second user equipment. At block 702, a first user equipment accesses a URL corresponding to a tracking device that is recovered. The first user equipment can comprise a client application that provides an interface for accessing the URL. At block 704, the first user equipment can receive a scanned image of a machine-readable code (e.g., QR code) or receive a code corresponding to the tracking device in response to a prompt. The code can be unique to each tracking device. In various embodiments, the code can correspond to a tracking device identifier of the tracking device. In this way, the code can be used to identify the tracking device. Upon verifying the code, via, for example, a verification module of the client application, the first user equipment can transmit a message to and receive a message from a second user equipment associated with a user profile correlating to a unique identifier corresponding to the tracking device, as indicated in block 706.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving, from a first user equipment, a lost notification indicating that a tracking device associated with a target item is lost, the first user equipment paired with the tracking device and the tracking device having a unique tracking device identifier;
   obtaining a location information corresponding to a second user equipment in response to receiving the lost notification;
   determining based at least partially on the location information of the second user equipment whether the second user equipment is included in a list of user equipment available to participate in a search party;
   if the second user equipment is in the list, transmitting a search request to the second user equipment to locate the target item, the search request comprising the unique tracking device identifier;
   transmitting a push notification to the second user equipment, the push notification comprising a prompt to confirm participation in the search party; and
   receiving confirmation from the second user equipment indicating that the second user equipment is participating in the search party to locate the target item.

2. The one or more non-transitory computer-readable media of claim 1, wherein the tracking device is configured to communicate with the first user equipment and further wherein the first user equipment is configured to transmit the lost notification when the tracking device is not located within a predetermined distance of the first user equipment.

3. The one or more non-transitory computer-readable media of claim 1, wherein the unique tracking device identifier corresponds to a user account that is associated with the first user equipment and at least one subscriber.

4. The one or more non-transitory computer-readable media of claim 1, wherein the acts further comprise:
   transmitting a first alert to the first user equipment when the tracking device is not located within a first predetermined distance from the first user equipment; and
   transmitting a second alert to the first user equipment when the tracking device is not located within a second predetermined distance from the first user equipment.

5. The one or more non-transitory computer-readable media of claim 1, wherein the search request further comprises a message comprising information related to the target item.

6. The one or more non-transitory computer-readable media of claim 5, wherein the acts further comprise:
   determining a privilege level associated with the second user equipment, wherein a content of the message is based at least partially on the privilege level associated with the second user equipment.

7. The one or more non-transitory computer-readable media of claim 1, wherein the acts further comprise:
   determining a privilege level associated with the second user equipment, wherein a method in which the search request is delivered to the second user equipment is based at least partially on the privilege level associated with the second user equipment.

8. The one or more non-transitory computer-readable media of claim 1, wherein the acts further comprise:
prompting the second user equipment to confirm a location information corresponding to the tracking device;
receiving a code corresponding to the tracking device from the second user equipment;
enabling the second user equipment to communicate with the first user equipment upon determining that the code is valid; and
transmitting the location information corresponding to the tracking device to the first user equipment.

9. A computer-implemented method, comprising:
storing a unique tracking device identifier corresponding to a tracking device associated with a first user equipment, wherein the tracking device is associated with a target item;
receiving from the first user equipment a lost notification indicating that the tracking device is lost;
obtaining a location information corresponding to a second user equipment, wherein the second user equipment is associated with a privilege level;
determining whether the second user equipment is located within a target area;
if the second user equipment is located within the target area, transmitting a search request to the second user equipment to locate the target item, wherein a content of the search request is based at least partially on the privilege level associated with the second user equipment, further wherein the search request includes the unique tracking device identifiers;
transmitting a push notification to the second user equipment, the push notification comprising a prompt to confirm participation in a search party; and
receiving confirmation from the second user equipment indicating that the second user equipment is participating in the search party to locate the target item.

10. The computer-implemented method of claim 9, wherein the location information of the second user equipment is time stamped.

11. The computer-implemented method of claim 9, wherein the second user equipment comprises a second tracking device.

12. The computer-implemented method of claim 9, further comprising:
enabling the second user equipment to communicate with the tracking device based at least partially on the privilege level associated with the second user equipment.

13. The computer-implemented method of claim 9, further comprising:
enabling the tracking device to transmit alerts to the second user equipment when the second user equipment is within a predetermined radius of the tracking device.

14. The computer-implemented method of claim 9, further comprising:
obtaining an updated location information corresponding to the second user equipment;
determining whether the updated location information indicates that the second user equipment is located within the target area; and
if the second user equipment is not located within the target area, withdrawing the search request to the second user equipment to locate the target item.

15. The computer-implemented method of claim 9, wherein the tracking device is configured to communicate with the first user equipment via a short-range radio access technology (RAT).

16. The computer-implemented method of claim 9, wherein a method in which the search request is delivered to the second user equipment is based at least partially on the privilege level associated with the second user equipment.

17. The computer-implemented method of claim 9, further comprising:
receiving a code corresponding to the tracking device from the second user equipment, wherein the second user equipment is configured to input the code; and
enabling the second user equipment to communicate with the first user equipment upon determining that the code is valid.

18. A system, comprising:
one or more non-transitory storage mediums configured to provide stored code segments, the one or more non-transitory storage mediums coupled to one or more processors, each configured to execute the code segments and causing the one or more processors to:
receive from a first user equipment a lost notification indicating that a tracking device paired with the first user equipment is lost when the tracking device is located more than a predetermined distance from the first user equipment, wherein the tracking device includes a unique tracking device identifier;
obtain a location information corresponding to a second user equipment to determine whether the second user equipment is in a target area;
if the location information indicates that the second user equipment is in the target area, determining whether the second user equipment is included in a list of user equipment available to participate in a search party;
if the second user equipment is in the list, transmitting a search request to the second user equipment to locate the tracking device, the search request comprising the unique tracking device identifier;
prompt the second user equipment to confirm a location information corresponding to the tracking device;
receive a code corresponding to the tracking device from the second user equipment;
enable the second user equipment to communicate with the first user equipment upon determining that the code is valid; and
transmit the location information corresponding to the tracking device to the first user equipment.

19. The system of claim 18, wherein the one or more processors are further configured to:
determine a privilege level associated with the second user equipment, wherein a method in which the search request is delivered is based at least partially on the privilege level associated with the second user equipment.

20. The system of claim 18, wherein the one or more processors are further configured to:
transmit a push notification to the second user equipment, the push notification comprising a prompt to confirm participation in the search party; and
receive confirmation from the second user equipment indicating that the second user equipment is participating in the search party to locate the target item.

* * * * *